United States Patent
Fox et al.

(10) Patent No.: US 10,667,081 B2
(45) Date of Patent: May 26, 2020

(54) PROVIDING LOCATION-BASED SERVICES USING GEO-FENCING TRACKING TECHNIQUES

(71) Applicant: International Business Machines Corporation, Armonk, NY (US)

(72) Inventors: Jeremy R. Fox, Georgetown, TX (US); Shikhar Kwatra, Durham, NC (US); Sarbajit K. Rakshit, Kolkata (IN); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/054,447

(22) Filed: Aug. 3, 2018

(65) Prior Publication Data

US 2020/0045501 A1   Feb. 6, 2020

(51) Int. Cl.
*H04W 24/00* (2009.01)
*H04W 4/021* (2018.01)
*H04W 4/02* (2018.01)
*H04W 4/06* (2009.01)
*G06Q 50/00* (2012.01)
*G06N 3/02* (2006.01)

(52) U.S. Cl.
CPC .............. *H04W 4/022* (2013.01); *G06N 3/02* (2013.01); *G06Q 50/01* (2013.01); *H04W 4/025* (2013.01); *H04W 4/06* (2013.01)

(58) Field of Classification Search
USPC .......................... 455/456.3, 414.2; 705/14.66
See application file for complete search history.

(56) References Cited

U.S. PATENT DOCUMENTS

| | | | |
|---|---|---|---|
| 9,552,605 B2 | 1/2017 | Caralis et al. | |
| 9,633,548 B2 | 4/2017 | Sager et al. | |
| 9,659,483 B2 | 5/2017 | Sager et al. | |
| 2010/0250370 A1* | 9/2010 | Jones | G06Q 10/06 705/14.66 |

(Continued)

OTHER PUBLICATIONS

Anonymously, A system and method to infer trajectories from partial observations, IPCOM000235869D, Mar. 28, 2014, 6 pages.

(Continued)

*Primary Examiner* — David Q Nguyen
(74) *Attorney, Agent, or Firm* — Anthony V. England; Edell, Shapiro & Finnan, LLC

(57) ABSTRACT

A computer system tracks geographical locations traversed by a user to provide location based services. One or more geographical locations traversed by a user are tracked via a portable location device. Geo-fencing areas corresponding to the one or more geographical areas are determined. One or more geo-fencing area profile scores are generated for the user based on attributes of the traversal of the geo-fencing areas. Re-location of the user to a new geographic location is detected via the portable location device. Location-based services are provided for the new geographic location based on at least one geo-fencing area profile score of the user. Embodiments of the present invention further include a method and program product for tracking geographical locations traversed by a user to provide location based services in substantially the same manner described above.

18 Claims, 5 Drawing Sheets

(56) References Cited

U.S. PATENT DOCUMENTS

| | | | |
|---|---|---|---|
| 2014/0045516 A1* | 2/2014 | Turgman | H04W 4/02 |
| | | | 455/456.1 |
| 2016/0057575 A1* | 2/2016 | Chang | H04W 4/021 |
| | | | 455/414.2 |
| 2016/0223998 A1* | 8/2016 | Songkakul | H04W 4/021 |
| 2016/0267516 A1* | 9/2016 | Walz | G06Q 20/3226 |
| 2017/0318102 A1* | 11/2017 | Lada | H04L 67/22 |
| 2018/0124573 A1* | 5/2018 | Lee | H04W 4/021 |

OTHER PUBLICATIONS

Anonymounsly, Mobile Device Resource Conservation During Geo-Location Operations, IPCOM000231493D, Oct. 2, 2013, 18 pages.
Anonymounsly, Method and system for geo-fencing based on symptom or medicine purchase pattern, IPCOM000236984D, May 23, 2014, 2 pages.
Namiot et al., Geofence and Network Proximity, 2013, 6 pages.
Muriach, Information Provision Improvement with a Geofencing Event-based System, Masters Program in Geospatial Technologies, Feb. 2015, 51 pages.

* cited by examiner

PROVIDING LOCATION-BASED SERVICES USING GEO-FENCING TRACKING TECHNIQUES

BACKGROUND

1. Technical Field

Present invention embodiments relate to providing location-based services, and more specifically, to providing location-based services using geo-fencing tracking techniques.

2. Discussion of the Related Art

Location-based services may include software-level services that utilize location data to select, provide, and control features. Location-based services can be used in a variety of contexts, including health, navigation, entertainment, and work. For example, a location-based service may assist a user with finding nearby businesses, or may provide live traffic condition updates.

One way to provide location-based services is by using geo-fencing areas, which are virtual perimeters that correspond to real-world geographical areas. Depending on the geo-fencing area in which a user is located, different conditions may be met that affect the type and manner of location-based services being provided. However, manually defining geo-fencing areas can be time-consuming and error-prone, and even properly-defined geo-fencing areas may become inaccurate over time.

SUMMARY

According to one embodiment of the present invention, a computer system tracks geographical locations traversed by a user to provide location based services. One or more geographical locations traversed by a user are tracked via a portable location device. Geo-fencing areas corresponding to the one or more geographical areas are determined. One or more geo-fencing area profile scores are generated for the user based on attributes of the traversal of the geo-fencing areas. Re-location of the user to a new geographic location is detected via the portable location device. Location-based services are provided for the new geographic location based on at least one geo-fencing area profile score of the user. Embodiments of the present invention further include a method and program product for tracking geographical locations traversed by a user to provide location based services in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to providing location-based services, and more specifically, to providing location-based services using geo-fencing techniques. A geo-fence is a virtual perimeter that corresponds to a real-world geographic area, such as a park, a business, or a school. As a user travels to various geo-fencing areas over time, the user's location can be tracked via their mobile device to provide location-based services, such as location-specific recommendations, travel directions, and other notifications. When the movement patterns of multiple users are considered, collaborative geo-fencing areas may be defined that can be used to provide large-scale location-based services.

Present invention embodiments provide personalized location-based services by learning a user's preferences over time. Furthermore, multiple users, such as groups of friends, family, or colleagues linked together on a social network, can be tracked and profiled collectively to provide collaborative location-based services to members of the group. When a user relocates, either temporarily or permanently, to a new area, the user can be provided with location-based services for the new area based on the user's prior activity.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
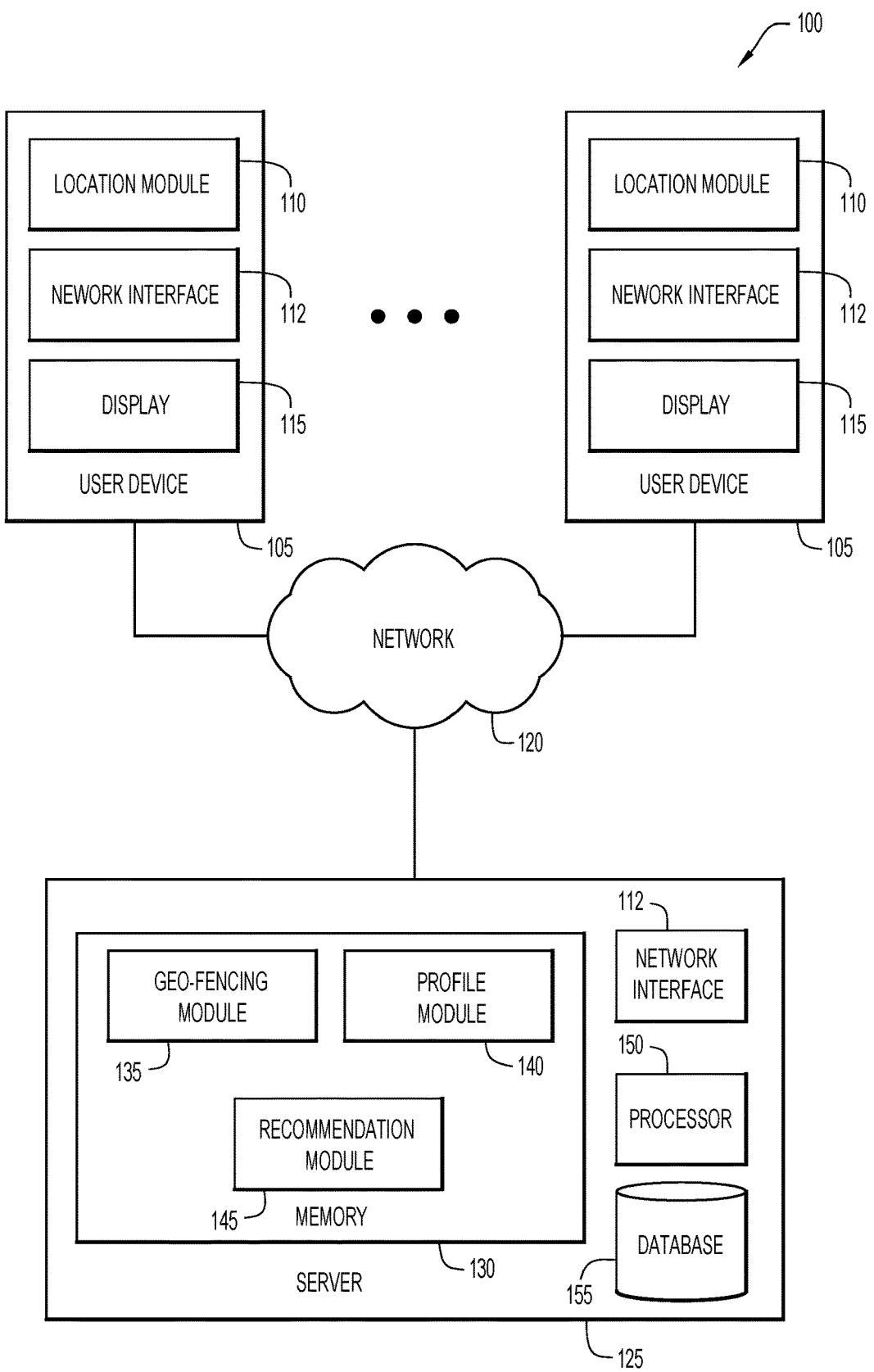
FIG. 1 is a block diagram depicting a computing environment for providing location-based services in accordance with an embodiment of the present invention.

Present invention embodiments will now be described in detail with reference to the Figures. FIG. 1 is a block diagram depicting a computing environment 100 for providing location-based services in accordance with an embodiment of the present invention. As depicted, computing environment 100 includes one or more user devices 105 and a server 125. It is to be understood that the functional division among components of computing environment 100 have been chosen for purposes of explaining the present invention embodiments and is not to be construed as a limiting example.

Each user device 105 includes a location module 110, a network interface 112, and a display 115. In various embodiments of the present invention, user device 105 may include any portable device whose location can be tracked, such as a laptop computer, a tablet computer, a netbook computer, a personal computer (PC), a personal digital assistant (PDA), a smart phone, a navigation system, or any programmable electronic device capable of executing computer readable program instructions. User device 105 may include internal and external hardware components, as depicted and described in further detail with respect to FIG. 4.

Location module 110 may include any device capable of determining the location of client device 105. Location may include one or more of latitude, longitude, and elevation. In one embodiment, location module 110 uses a global positioning system in order to determine location. In another embodiment, location module 110 uses triangulation to determine location. Location module 110 may share the location of user device 105 with server 125.

Display 115 may include any electronic device capable of presenting information in a visual form. For example, display 115 may be a liquid crystal display (LCD), a light-emitting diode (LED) display, an electronic ink display, and the like. User device 105 may use display 115 for presenting information using a location-based service, such as a location-specific recommendation, to a user.

Network 120 may include, for example, a local area network (LAN), a wide area network (WAN) such as the Internet, or a combination of the two, and includes wired, wireless, or fiber optic connections. In general, network 120 can be any combination of connections and protocols that will support communications between user device 105 and server 125 using their respective network interfaces 112 in accordance with an embodiment of the present invention.

Server 125 includes a network interface 112, memory 130, processor 150, and storage 155. In general, server 125 and its modules may receive location information from user device 105 and provide one or more location-based services to user device 105. Server 125 may include internal and external hardware components, as depicted and described in further detail with respect to FIG. 4.

Geo-fencing module 135, profile module 140, and recommendation module 145 may include one or more modules or units to perform various functions of present invention embodiments described below. Geo-fencing module 135, profile module 140, and recommendation module 145 may be implemented by any combination of any quantity of software and/or hardware modules or units, and may reside within memory 130 of user device 105 for execution by a processor, such as processor 150.

Geo-fencing module 135 may create, manage, and update geo-fencing areas that correspond to real-world locations. Geo-fencing module 135 may receive location data from location module 110 of each user device 105, which correlates to the movement of the user who is associated with the user device 105. By analyzing location data over time, geo-fencing module 135 may establish geo-fencing areas that correspond to real-world locations. Geo-fencing module 135 may disregard potential geo-fencing areas in which a user does not spend a threshold amount of time, where the threshold may be pre-defined for various purposes. For example, if a user is traveling on a road, but the amount of time spent in any location of the road is low, then the respective road area may not be considered as a geo-fencing area. If a user spends thirty minutes in one area on a daily basis, the area may be considered as one of the user's geo-fencing areas. In some embodiments, geo-fencing module 135 generates geo-fencing areas not simply based on statistical patterns, but rather may dynamically create and manage geo-fencing areas in new ways, as disclosed herein. It should be appreciated that in some embodiments of the present application, once a first geo-fencing area is determined for a first geographical location, one or more computer system modules may map a second geo-fencing area to a second geographical location based on the properties of the first geo-fencing area, so that the second geo-fencing area has properties that correspond to the first geo-fencing area's properties in a manner that is relevant to the user in question.

Geo-fencing module 135 can define the bounds of a geo-fencing area according to mobility patterns determined by analyzing location data from one or multiple user devices 105. Geo-fencing module 135 may select a name or designation for an area, such as "park" or "XYZ Corporation" by analyzing proprietary and/or public-domain geographical data. In some embodiments, geo-fencing module 135 accesses a geographic information system (GIS) to obtain the name and/or bounds of a geo-fencing area. Geo-fencing areas may be updated using location data from one or more user devices 105 as the bounds of a geo-fencing area change over time. In some embodiments, geo-fencing module 135 defines geo-fencing areas statically as semi-persistent constructs that match one or more given properties of a user profile, enabling a user to self-select from a plurality of geo-fencing areas that share the same given property or properties.

For example, when individuals bring user devices 105 with them while playing rounds of golf, location data from each user device 105 may be analyzed by geo-fencing module 135 to define the bounds of the golf course. The fact that the geo-fencing area corresponds to a golf course instead of, for example, a park, can be determined using geographical data that is obtained from one or more public or private servers. If the golf course later expands by adding an extra eighteen holes, the bounds of the geo-fencing area corresponding to the golf course may be adjusted accordingly as location data from is received from user devices 105 of individuals playing the new golf holes.

A geo-fencing area may include an area within a predetermined radius around a point location. A geo-fencing area may alternatively be defined as an area within a predetermined radius around a point location that is determined by a property of the geographical area around the point. Likewise, a geo-fencing area may be some other predetermined geometry around a point location (e.g., a rectangle, square, etc.) or a geometry determined by a property of the geographical area around the point.

Profile module 140 may create geo-fencing area profile scores for users based on the user's mobility patterns over time with respect to geo-fencing areas, which can be determined according to location data from each user device 105. When profiling users, profile module 140 may profile each user individually, and may profile groups of users together. Profile module 140 profiles users or groups of users by weighing various metrics that together comprise geo-fencing area profile scores. The metrics that are considered may include the geographic importance of any geo-fencing area visited by users, the number of geo-fencing areas visited by users, the frequency of visits to geo-fencing areas, and the duration of visits to geo-fencing areas.

The geographic importance of a given geo-fencing area may be determined according to whether a geo-fencing area is associated with important activities such as work, medical care, banking, legal services, and the like, or less-important activities, such as recreation, entertainment, and shopping. For example, if a user has a geo-fencing pattern of visiting their location of employment regularly on Monday through Friday from 8:00 AM to 5:00 PM, the geo-fencing area associated with the location of employment may be assigned a higher importance during the temporal window of 8:00 AM to 5:00 PM on weekdays. Similarly, a geo-fencing area associated with recreation may yield the highest priority on Saturday mornings from 8:00 AM to 12:00 PM based on temporal tracking of the user; however, during the rest of the week, the recreation geo-fencing area may be assigned a lower priority.

The number of geo-fencing areas visited by users, frequency of user's visits to geo-fencing areas, and duration of users' visits to geo-fencing areas may all be determined according to data from location module 110 of each user device 105. These metrics may also be used describe the importance of a geo-fencing area, since a geo-fencing area that is visited frequently, visited by more individuals at a time, and/or visited by individuals who stay for a lengthy duration of time may be considered to be more important compared to a geo-fencing area that receives few visitors, is infrequently visited, and/or is visited by individuals who do not linger for a long duration.

Based on each user's geo-fencing area metrics, profile module 140 may generate geo-fencing area profile scores for users and groups that can be used to identify locations of interest to the users and to provide other location-based services. Profile module 140 may employ conventional or other machine learning techniques to generate profiles for users. In some embodiments, profile module 140 feeds a user's geo-fencing area metrics into a reconfigurable weighted multi-level neural network classification model that generates outputs of the desired or most probably geo-fencing areas for a user. Profile module 140 may employ unsupervised learning with a K-means clustering model in conjunction with reinforced feedback to determine geo-fencing area profile scores for a user.

When profile module 140 generates (or updates) a profile for an individual user, profile module 140 may consider geo-fencing area profile scores for friends of the user. In some embodiments, profile module 140 integrates with one or more social media networks to learn about friends of the user. For example, profile module 140 may generate a social network geo-fencing area profile score for a user based on the scores of contacts of the user in a social network. Profile module 140 may also generate profile scores for groups of users, wherein each of the user's geo-fencing area scores may be averaged or merged together to create a group profile score. For example, while each member of a family may have their own individual profiles, profile module 140 may also create a user group profile for the family. Thus, when a group of users travels together, location-based services can be provided that would best serve the group as a whole.

Recommendation module 145 may generate recommendations for a user or group of users based on the profile of the user or group of users. Using the profile of a user or group of users, recommendation module 145 may recommend new locations in the user's area, or may recommend locations when the user or group of users relocates to another geographical area. For example, if a user typically visits a cinema on Friday nights, then recommendation module 145 may recommend a newly-opened theater for the user to visit the next Friday. If a user is vacationing in a different city, recommendation module 145 may determine locations of interest to recommend to the user in the new city that are based on the user's profile. For example, if a user plays golf in the morning in the user's hometown, then recommendation module 145 may generate a recommendation of a golf course near the user's hotel when the user is traveling; the recommendation may be sent to the user in the morning at a time before the user would normally leave for the golf course in the user's home town.

Recommendation module 145 may use conventional or other machine learning algorithms to generate recommendations to users. Recommendations may be refined depending on whether a user accepts or declines the recommendation. In addition to basing recommendations on a user's (or user group's) profile, recommendation module 145 may base recommendations on the user's location as determined by location module 110, the time, the current weather conditions, the climate of the user's current location, and the current season. For example, recommendation module 145 may not recommend a location with a focus on outdoor activities if it is raining in the user's current location, if it is the off-season, and the like. Recommendation module 145 may generate recommendations using machine learning to learn patterns associated with services for a geographical location, and then provide location-based services by comparing the patterns pertaining to a user with the learned patterns of the geographical location. Recommendation module 145 may send a recommendation to user device 105 of a user, which presents the recommendation to the user on display 115.

Database 155 may include any non-volatile storage media known in the art. For example, database 155 can be implemented with a tape library, optical library, one or more independent hard disk drives, or multiple hard disk drives in a redundant array of independent disks (RAID). Similarly, data in database 155 may conform to any suitable storage architecture known in the art, such as a file, a relational database, an object-oriented database, and/or one or more tables. Database 155 may store geo-fencing area information, location history of users, geo-fencing area scores of users, profiles of users, and the like.

Figure 2:
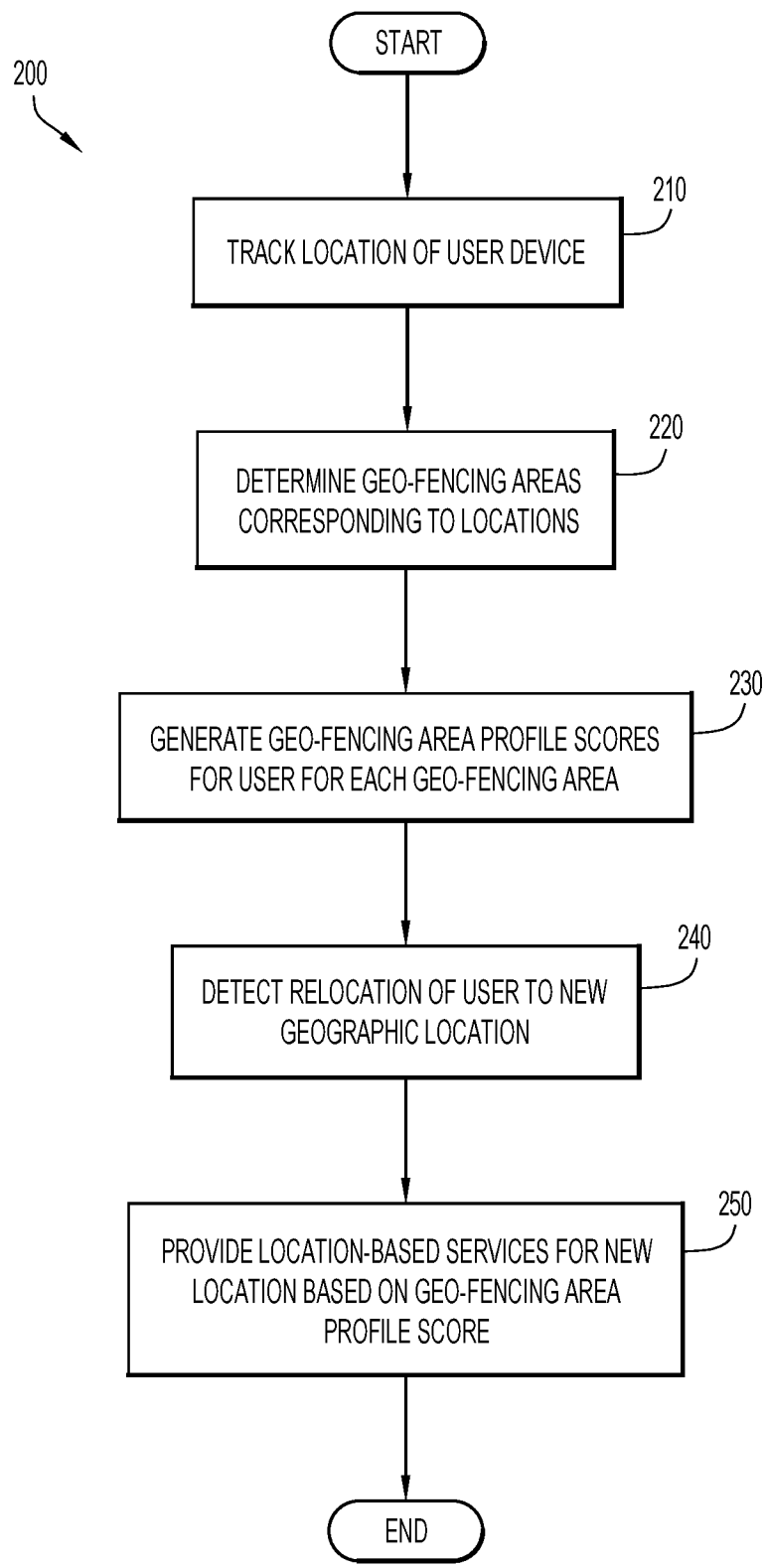
FIG. 2 is a flow chart depicting a method of providing location-based services in accordance with an embodiment of the present invention.

FIG. 2 is a flow chart depicting a method of providing location-based services in accordance with an embodiment of the present invention.

The location of a user device is tracked at operation 210. The user may be tracked via location module 110 of user device 105. Location module 110 may share location data with server 125 for analysis by its various modules.

Geo-fencing areas are determined that correspond to the tracked locations at operation 220. By comparing the user's location to a list of known geo-fencing areas, geo-fencing module 135 may determine the geo-fencing areas that correspond to tracked locations of a user. Geo-fencing module 135 may determine geo-fencing areas by accessing public geographical information and according to previous location history of users. In particular, geo-fencing module 135 can determine the bounds and name of a geo-fencing area using geographical information, and adjust the bounds according to location data of users who visit the geo-fencing area.

One or more geo-fencing area profile scores for a user (or group of users) for each geo-fencing area is generated at operation 230. Profile module 140 may generate geo-fencing area profile scores based on metrics such as the geographic importance of a geo-fencing area, the number of geo-fencing areas visited by a user (or group of users), the frequency of visits to a geo-fencing area, and/or the duration of visits to a geo-fencing area. Profile module 140 may use conventional or other machine learning techniques to generate geo-fencing area profile scores for a user, which can be used to indicate the likelihood that a user will find future location-based recommendations favorable.

Relocation of the user (or group of users) to a new geographic location is detected at operation 240. Relocation of a user may be determined by location module 110. In some embodiments, a user may be required to move a distance surpassing a predetermined threshold before the user is determined to have relocated. In order to determine that a user has relocated, the user's location may be compared to a location such as the user's permanent residence, the user's workplace, the center of a user's city of residence, or a location generated by averaging the coordinates of some or all of a user's geo-fencing area locations in a particular region, such as the user's city of residence.

Location-based services for the new location are provided to the user (or group of users) based on the user's geo-fencing area profile scores. For example, location recommendations and advertisements can be generated for a new location that match the preferences of a user or group of users based on analysis of their history of visiting geo-fencing areas in one or more previous locations. For example, if a group of users has a tendency of stopping at a particular nation-wide chain restaurant when the group of users travels together, then recommendation module 145 may issue a recommendation stating that the group of users is currently nearby a franchise of the chain restaurant. Recommendation module 145 may generate the recommendations, which are shared with each user via user device 105. In some embodiments, group communications are managed without requiring codes that the users must scan via their user devices to establish group membership. Recommendation module 145 may also consider factors such as the current season, temperatures, weather, length of a user's stay, and the like. For example, recommendation module 145 may not recommend a water park in the vicinity to a user in the middle of winter.

Figure 3A:
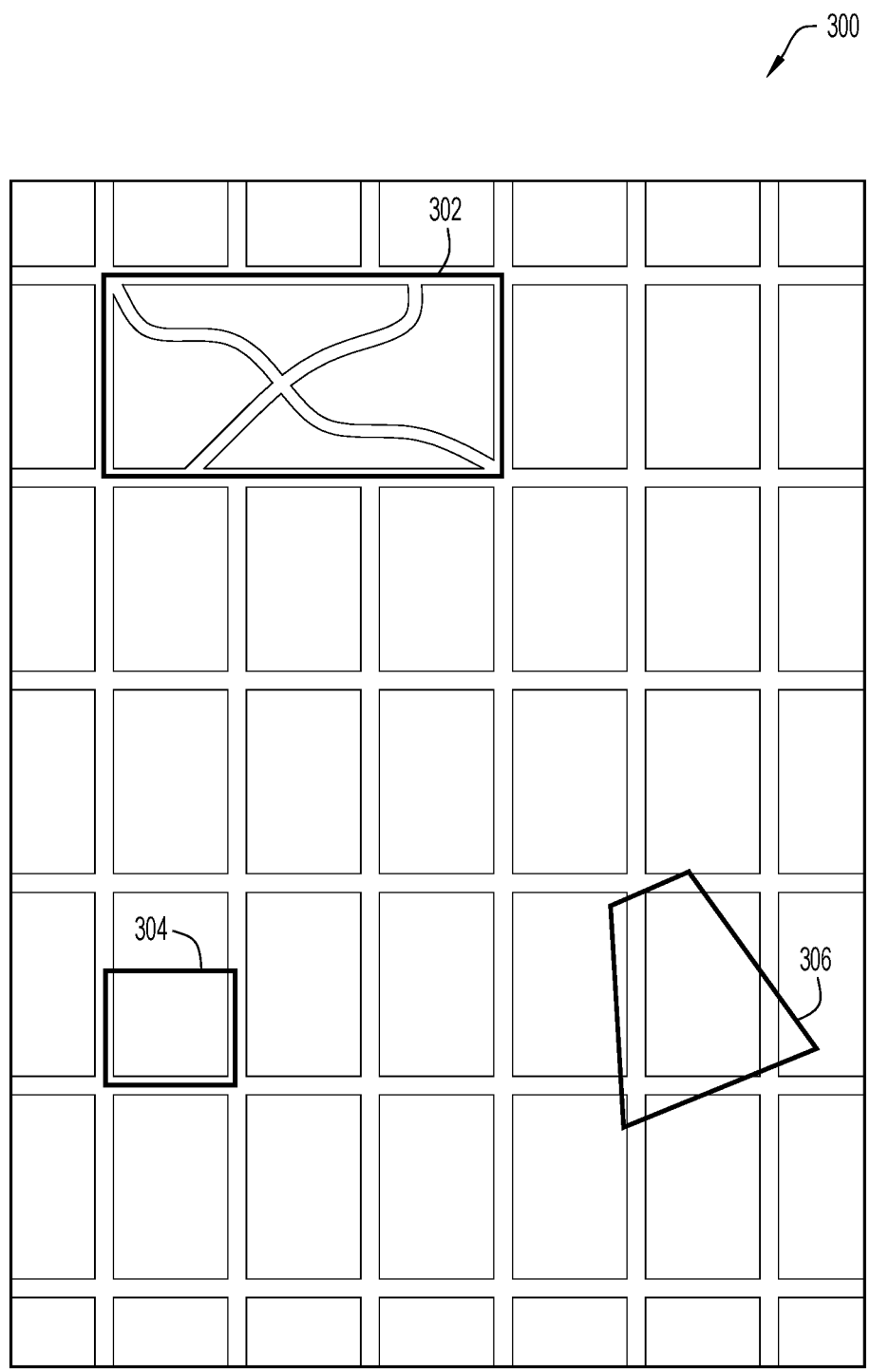
FIGS. 3A and 3B are maps depicting geo-fencing areas in accordance with an embodiment of the present invention.
Figure 3B:
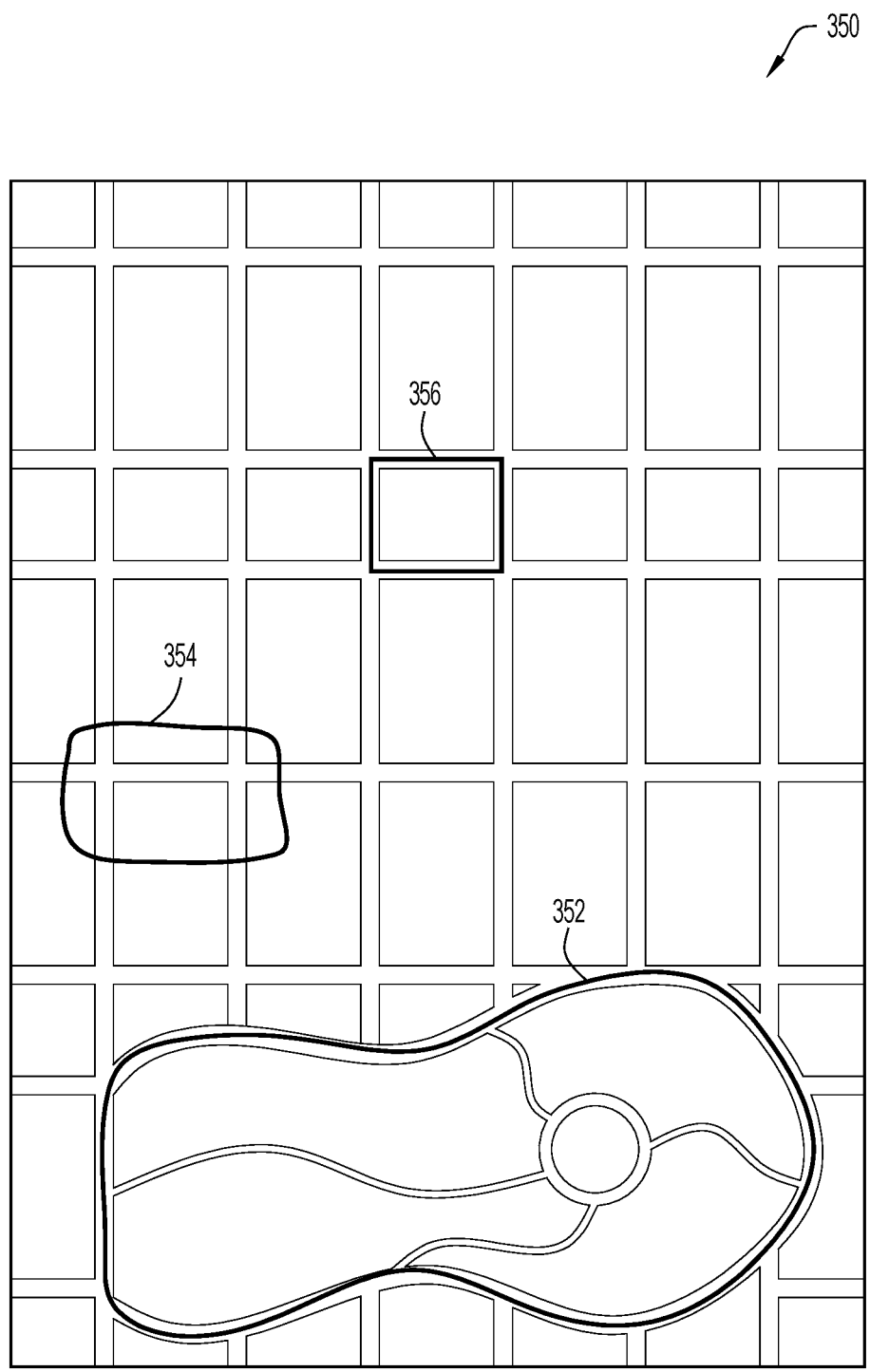

FIGS. 3A and 3B are maps depicting geo-fencing areas in accordance with an embodiment of the present invention. FIG. 3A depicts a first location 300 in which three geo-fencing areas are defined: a park 302, a residence 304, and a restaurant 306. FIG. 3B depicts a second location 350 having the geo-fencing areas corresponding to a park 352, a hotel 354, and a restaurant 356. The park 302, residence 304, and restaurant 306 may correspond to geo-fencing areas of a user in location 300. Based on a user's history of interaction with geo-fencing areas, profile module 140 generates profiles for the user for each geo-fencing area of location 300. For example, the user may live at residence 304, may visit park 302 on Sundays, and may dine at restaurant 306 on Wednesdays.

When the user relocates to location 350, recommendation module 145 may generate recommendations by comparing the user's geo-fencing profile to the geo-fencing areas in location 350. For example, since the user lives at residence 304, recommendation module 145 may recommend directions to hotel 354 when it is 9:00 PM and the user is in location 350. If the user is in location 350 on a Sunday, then recommendation module 145 may recommend park 352 as a potential location of interest for the user to visit on a Sunday. Since the user tends to dine at restaurant 306 on Wednesdays, recommendation module 145 may recommend a restaurant to the user while the user visits location 350. For example, if restaurant 306 is a geo-fencing area corresponding to an Italian restaurant, then recommendation module 145 may select a different restaurant in location 350, such as restaurant 356, that serves similar cuisine.

Figure 4:
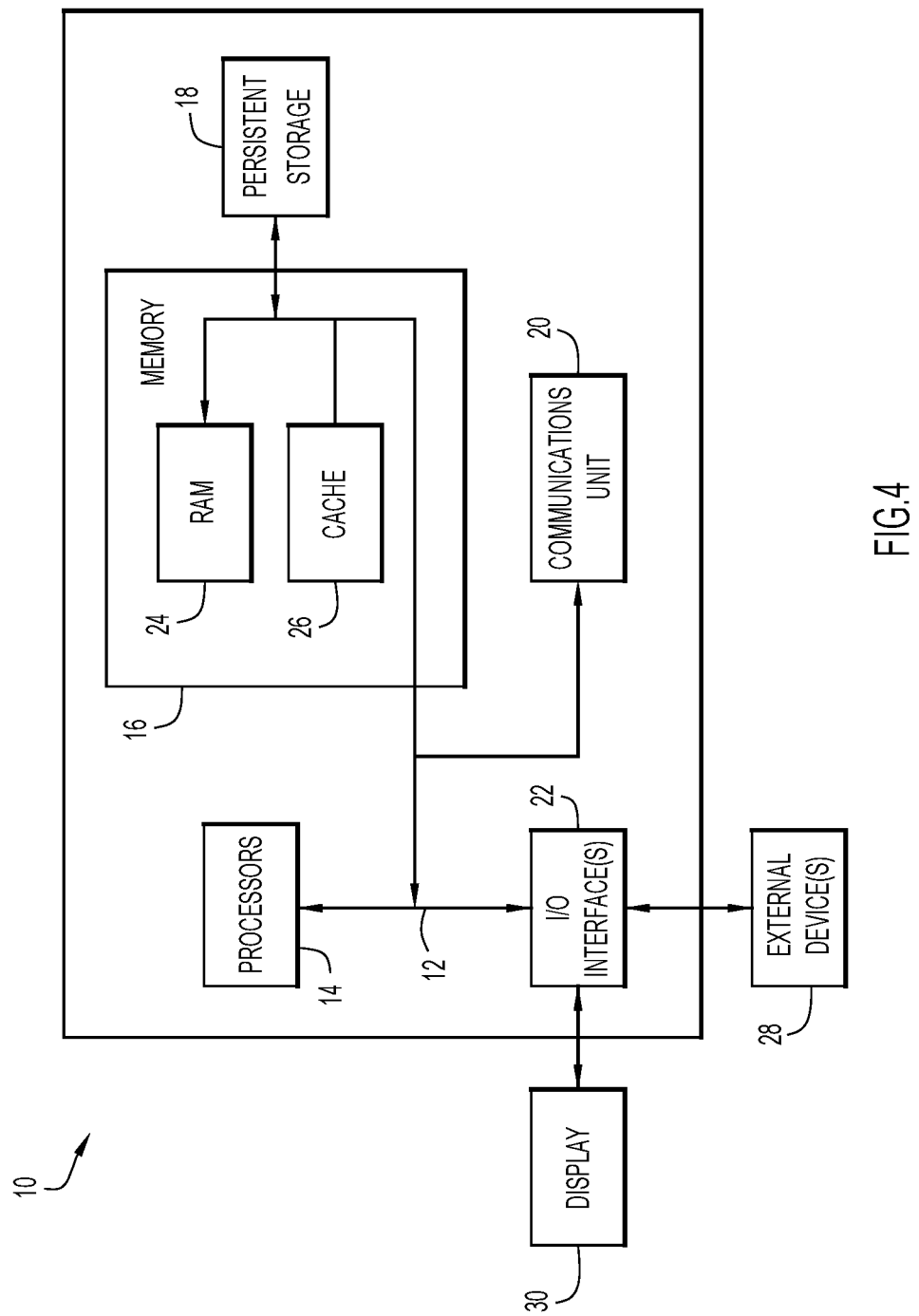
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105 and/or server 125, in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to location-based services (e.g., location data, movement data, geo-fencing area data, geo-fencing area profile data, recommendation data, etc.) may be stored within any conventional or other data structures (e.g., files, arrays, lists, stacks, queues, records, etc.) and may be stored in any desired storage unit (e.g., database, data or other repositories, queue, etc.) The data transmitted between user device 105 and server 125 may include any desired format and arrangement, and may include any quantity of any types of fields of any size to store the data.

Data relating to location-based services (e.g., location data, movement data, geo-fencing area data, geo-fencing area profile data, recommendation data, etc.) may include any information provided to, or generated by, user device 105 and/or server 125. Data relating to location-based services may include any desired format and arrangement, and may include any quantity of any types of fields of any size to store any desired data. The fields may indicate the presence, absence, actual values, or any other desired characteristics of the data of interest (e.g., quantity, value ranges, etc.).

The present invention embodiments may employ any number of any type of user interface (e.g., Graphical User Interface (GUI), command-line, prompt, etc.) for obtaining or providing information (e.g., data relating to location-based services), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing location-based services using geo-fencing tracking techniques.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, geo-fencing module 135, profile module 140, recommendation module 145, etc.). These systems may include any types of monitors and input devices (e.g., keyboard, mouse, voice recognition, etc.) to enter and/or view information.

It is to be understood that the software (e.g., browser software, communications software, server software, geo-fencing module 135, profile module 140, recommendation module 145, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., browser software, communications software, server software, geo-fencing module 135, profile module 140, recommendation module 145, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to location-based services). The database system may be implemented by any number of any conventional or other databases, data stores or storage structures (e.g., files, databases, data structures, data or other repositories, etc.) to store information (e.g., data relating to location-based services). The database system may be included within or coupled to the server and/or client systems. The database systems and/or storage structures may be remote from or local to the computer or other processing systems, and may store any desired data (e.g., data relating to location-based services).

The present invention embodiments may employ any number of any type of user interface (e.g., Graphical User Interface (GUI), command-line, prompt, etc.) for obtaining or providing information (e.g., data relating to location-based services), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of tracking geographical locations traversed by a user to provide location based services comprising:
    tracking one or more geographical locations traversed by a user via a portable location device;
    determining, via a processor, geo-fencing areas corresponding to the one or more geographical locations;
    generating, via the processor, one or more geo-fencing area profile scores for the user by applying attributes of the traversal of the geo-fencing areas to a multi-level neural network model, wherein the geo-fencing area profile scores indicate locations of interest to the user, and wherein generating the one or more geo-fencing area profile scores further comprises generating a group geo-fencing area profile score for a group of users, wherein the group geo-fencing area profile score comprises an average of geo-fencing area profile scores for the user and one or more other users;
    detecting re-location of the user a threshold distance away from the one or more geographical locations to a new geographic area via the portable location device; and
    providing, via the processor, location-based services including indicating one or more locations of interest to the user for the new geographic area based on at least one geo-fencing area profile score of the user associated with a prior geographical location traversed by the user and the group geo-fencing area profile score.

2. The computer-implemented method of claim 1, wherein the attributes of the traversal of the geo-fencing areas include one or more from a group of:
    an importance of a geo-fencing area;
    a number of geo-fencing areas traversed by the user;
    a frequency of traversing the geo-fencing areas; and
    a duration of time the user remained in the geo-fencing areas.

3. The computer-implemented method of claim 1, wherein generating the one or more geo-fencing area profile scores further comprises:
    generating a social network geo-fencing area profile score for the user based on geo-fencing area profile scores of contacts of the user in a social network.

4. The computer-implemented method of claim 1, wherein the location-based services include one or more from a group of an advertisement, a location recommendation, and a food recommendation.

5. The computer-implemented method of claim 1, wherein providing location-based services further comprises:
    utilizing machine learning to learn patterns associated with services for a corresponding geographic location; and
    providing the location-based services based on a comparison of patterns pertaining to the user with the learned patterns.

6. The computer-implemented method of claim 1, wherein the group geo-fencing area profile score is further based on analysis of prior geographical locations traversed by the user together with the one or more other users.

7. A computer system for tracking geographical locations traversed by a user to provide location based services, the computer system comprising:
    one or more computer processors;
    one or more computer readable storage media;
    program instructions stored on the one or more computer readable storage media for execution by at least one of the one or more computer processors, the program instructions comprising instructions to:
    track one or more geographical locations traversed by a user via a portable location device;
    determine geo-fencing areas corresponding to the one or more geographical locations;
    generate one or more geo-fencing area profile scores for the user by applying attributes of the traversal of the geo-fencing areas to a multi-level neural network model, wherein the geo-fencing area profile scores indicate locations of interest to the user, and wherein generating the one or more geo-fencing area profile scores further comprises generating a group geo-fencing area profile score for a group of users, wherein the group geo-fencing area profile score comprises an average of geo-fencing area profile scores for the user and one or more other users;
    detect re-location of the user a threshold distance away from the one or more geographical locations to a new geographic area via the portable location device; and
    provide location-based services including indicating one or more locations of interest to the user for the new geographic area based on at least one geo-fencing area profile score of the user associated with a prior geographical location traversed by the user and the group geo-fencing area profile score.

8. The computer system of claim 7, wherein the attributes of the traversal of the geo-fencing areas include one or more from a group of:
    an importance of a geo-fencing area;
    a number of geo-fencing areas traversed by the user;
    a frequency of traversing the geo-fencing areas; and a duration of time the user remained in the geo-fencing areas.

9. The computer system of claim 7, wherein the instructions to generate the one or more geo-fencing area profile scores further comprise instructions to:
  generate a social network geo-fencing area profile score for the user based on geo-fencing area profile scores of contacts of the user in a social network.

10. The computer system of claim 7, wherein the location-based services include one or more from a group of an advertisement, a location recommendation, and a food recommendation.

11. The computer system of claim 7, wherein the instructions to provide location-based services further comprise instructions to:
  utilize machine learning to learn patterns associated with services for a corresponding geographic location; and
  provide the location-based services based on a comparison of patterns pertaining to the user with the learned patterns.

12. The computer system of claim 7, wherein the group geo-fencing area profile score is further based on analysis of prior geographical locations traversed by the user together with the one or more other users.

13. A computer program product for tracking geographical locations traversed by a user to provide location based services, the computer program product comprising one or more computer readable storage media collectively having program instructions embodied therewith, the program instructions executable by a computer to cause the computer to:
  track one or more geographical locations traversed by a user via a portable location device;
  determine geo-fencing areas corresponding to the one or more geographical locations;
  generate one or more geo-fencing area profile scores for the user by applying attributes of the traversal of the geo-fencing areas to a multi-level neural network model, wherein the geo-fencing area profile scores indicate locations of interest to the user, and wherein generating the one or more geo-fencing area profile scores further comprises generating a group geo-fencing area profile score for a group of users, wherein the group geo-fencing area profile score comprises an average of geo-fencing area profile scores user scores for the user and one or more other users;
  detect re-location of the user a threshold distance away from the one or more geographical locations to a new geographic area via the portable location device; and
  provide location-based services including indicating one or more locations of interest to the user for the new geographic area based on at least one geo-fencing area profile score of the user associated with a prior geographical location traversed by the user and the group geo-fencing area profile score.

14. The computer program product of claim 13, wherein the attributes of the traversal of the geo-fencing areas include one or more from a group of:
  an importance of a geo-fencing area;
  a number of geo-fencing areas traversed by the user;
  a frequency of traversing the geo-fencing areas; and
  a duration of time the user remained in the geo-fencing areas.

15. The computer program product of claim 13, wherein the instructions to generate the one or more geo-fencing area profile scores further comprise instructions to:
  generate a social network geo-fencing area profile score for the user based on geo-fencing area profile scores of contacts of the user in a social network.

16. The computer program product of claim 13, wherein the location-based services include one or more from a group of an advertisement, a location recommendation, and a food recommendation.

17. The computer program product of claim 13, wherein the instructions to provide location-based services further comprise instructions to:
  utilize machine learning to learn patterns associated with services for a corresponding geographic location; and
  provide the location-based services based on a comparison of patterns pertaining to the user with the learned patterns.

18. The computer program product of claim 13, wherein the group geo-fencing area profile score is further based on analysis of prior geographical locations traversed by the user together with the one or more other users.

* * * * *